(12) United States Patent
Shinozaki

(10) Patent No.: US 8,331,932 B2
(45) Date of Patent: Dec. 11, 2012

(54) WIRELESS BASE STATION AND MOBILE STATION

(75) Inventor: Atsushi Shinozaki, Atsugi (JP)

(73) Assignee: Fujitsu Limited, Kawasaki (JP)

(*) Notice: Subject to any disclaimer, the term of this patent is extended or adjusted under 35 U.S.C. 154(b) by 931 days.

(21) Appl. No.: 11/826,890

(22) Filed: Jul. 19, 2007

(65) Prior Publication Data

US 2008/0096556 A1   Apr. 24, 2008

Related U.S. Application Data

(63) Continuation of application No. 11/191,990, filed on Jul. 29, 2005.

(30) Foreign Application Priority Data

Oct. 27, 2004   (JP) .................................. 2004-312345

(51) Int. Cl.
*H04W 4/00* (2009.01)
*H04W 36/00* (2009.01)
*H04W 40/00* (2009.01)

(52) U.S. Cl. .................. 455/435.1; 455/435.2; 455/443; 455/444; 455/449

(58) Field of Classification Search .................. 455/438, 455/435.1–435.3, 443, 444, 446, 449, 502, 455/453, 63.1
See application file for complete search history.

(56) References Cited

U.S. PATENT DOCUMENTS

| | | | |
|---|---|---|---|
| 5,212,822 A * | 5/1993 | Fukumine et al. | 455/435.3 |
| 5,588,043 A | 12/1996 | Tiedemann, Jr. et al. | |
| 5,666,652 A | 9/1997 | Lin | |
| 5,732,350 A | 3/1998 | Marko et al. | 455/435.1 |
| 5,832,381 A * | 11/1998 | Kauppi | 455/432.1 |
| 5,912,884 A | 6/1999 | Park et al. | 370/331 |
| 5,982,757 A * | 11/1999 | Curtis et al. | 370/328 |
| 6,006,093 A | 12/1999 | Aalto et al. | 455/443 |
| 6,163,695 A * | 12/2000 | Takemura | 455/456.4 |
| 6,205,336 B1 | 3/2001 | Ostrup et al. | 455/444 |
| 6,212,389 B1 | 4/2001 | Fapojuwo | 455/453 |
| 6,272,344 B1 | 8/2001 | Kojima | |
| 6,275,706 B1 | 8/2001 | Rune | 455/456.1 |
| 6,330,446 B1 | 12/2001 | Mori | 455/435.2 |
| 6,363,255 B1 | 3/2002 | Kuwahara | |
| 6,832,093 B1 | 12/2004 | Ranta | 455/456.4 |
| 6,868,270 B2 | 3/2005 | Dent | |

(Continued)

FOREIGN PATENT DOCUMENTS

JP   61-018229   1/1986

(Continued)

OTHER PUBLICATIONS

Non-Final Office Action date Jan. 19, 2010 U.S. Appl. No. 11/191,990.

(Continued)

*Primary Examiner* — Dwayne Bost
*Assistant Examiner* — Christopher Kohlman
(74) *Attorney, Agent, or Firm* — Murphy & King, P.C.

(57) ABSTRACT

A mobile station used in a mobile communication system which accepts location registrations from mobile stations in order to perform mobile station location management, the mobile station being comprising a detection means which detects that it is in an overlap region of hierarchical location registration areas; and a delay means which delays location registration when the detection has been made.

5 Claims, 6 Drawing Sheets

Wireless zone formed by each wireless base station 30

U.S. PATENT DOCUMENTS

| | | |
|---|---|---|
| 7,062,272 B2 | 6/2006 | Grilli et al. ............... 455/435.1 |
| 7,164,911 B2 * | 1/2007 | Watanabe ............... 455/435.1 |
| 7,369,849 B2 | 5/2008 | Fraser |
| 7,502,613 B2 | 3/2009 | Namiki |
| 2002/0102976 A1 | 8/2002 | Newbury et al. |
| 2002/0105932 A1 | 8/2002 | Miya |
| 2003/0096612 A1 | 5/2003 | Kim et al. |

FOREIGN PATENT DOCUMENTS

| | | |
|---|---|---|
| JP | 04-123533 | 4/1992 |
| JP | 05-055991 | 3/1993 |
| JP | 06-244780 | 9/1994 |
| WO | 0115479 A1 | 3/2001 |

OTHER PUBLICATIONS

Extended European Search report dated Jun. 11, 2010 European Patent Application No. 05255010.0-1249/1653763.
Non-Final Office Action dated Oct. 20, 2006 U.S. Appl. No. 11/191,990.
Non-Final Office Action dated Aug. 24, 2007 U.S. Appl. No. 11/191,990.
Final Office Action dated Mar. 22, 2007 U.S. Appl. No. 11/191,990.
Final Office Action dated Jun. 6, 2008 U.S. Appl. No. 11/191,990.
Final Office Action dated Sep. 7, 2010 U.S. Appl. No. 11/191,990.
Notice of Allowance dated Dec. 1, 2010 of parent U.S. Appl. No. 11/191,990.

* cited by examiner

WIRELESS BASE STATION AND MOBILE STATION

CROSS REFERENCE TO RELATED APPLICATION

The present application is a continuation of U.S. patent application Ser. No. 11/191,990, filed Jul. 29, 2005 and incorporated herein by reference, which is related to and claims priority to Japanese Application No. 2004-312345 filed Oct. 27, 2004 in the Japanese Patent Office, the contents of which are incorporated by reference herein.

BACKGROUND OF THE INVENTION

1. Field of the Invention

The present invention relates to wireless base stations and mobile stations used in a wireless communication system in which location registration is performed. Preferably, it relates to wireless base station and mobile stations used in a wireless communication system wherein the location registration areas are hierarchical (multilayered).

2. Description of the Related Art

System Configuration

FIG. 1 shows the configuration of a wireless communication system. While there are communications systems based on various schemes, the description here takes as an example a W-CDMA (UTRA FDD) mobile communication system.

In the drawing, 1 is a core network, 2 is a wireless base station controller (RNC: Radio Network Controller), 3 is a wireless bases station (NodeB) and 4 is a mobile station (UE: User Equipment).

Core network 1 is a network used for routing in the wireless communication system. The core network can comprise for instance an ATM switched network, packet switched network, router network, etc.

Here, an example will be considered with two types of nodes that perform routing: MSC for nodes that perform routing of voice communication, etc (line switching), and SGSN for nodes that perform routing of packet communication, etc (packet switching).

Core network 1 is also connected to other public networks (PSTN), etc, enabling the mobile station 4 to communicate with stationary telephones and the like as well.

The wireless base station controller 2 is positioned as a higher level device of the wireless base stations 3, and is provided with a function of controlling these wireless base stations 3 (management of wireless resources used, etc).

Furthermore, the wireless base station controller 2 has the function of executing outer loop transmission power control and a handover control function, whereby the signal from a single mobile station 4 is received via a plurality of subordinate wireless base stations 3, and the data with the best quality is selected and transmitted to the core network 1 during handover.

The wireless base stations 3 carry on radio communication with the mobile station 4, with the wireless resources being managed by RNC 2. Furthermore, the wireless base stations 3 are provided with the function of executing inner loop transmission power control.

When the mobile station 4 is within the wireless area of a wireless base station 3, it establishes a wireless link to the wireless base station 3 and performs communication with other communication devices via the core network 1.

The interface between the core network 1 and RNC 2 is referred to as the Iu interface, the interface between the core network and RNC 2 is referred to as the Iur interface, the interface between RNC 2 and each wireless base station 3 is called the Iub interface, and the interface between the wireless base station 3 and the mobile station 4 is called the Uu interface. The network formed by devices 2~3 is referred to in particular as the radio access network (RAN).

Location Registration

Next, the location registration processing performed by the mobile station will be described using FIG. 2. FIG. 2 is a diagram illustrating the configuration of a location registration area.

In the drawing, 11, 12 and 13 are nodes which make up the core network 1, 11 represents an MSC (Mobile Switching Center), 12 represents an SGSN (Serving GPRS Support Node), and 13 represents an HLR (Home Location Register).

An MSC is a node which performs line switching for voice communication and the like, When performing reception of voice communication and the like to the mobile station 4, the MSC treats the wireless zone formed by the subordinate wireless base stations 3 as a single location registration area (LA #1, etc). The MSC has the function of calling the mobile station 4, and depending on the response from the mobile station 4, it establishes a communication path to mobile station 4 via one of the wireless base stations 3 making up the wireless zone in the location registration area in which the response was received.

SGSN is a node that performs packet switching. When performing reception processing of packet communication and the like to the mobile station 4, the SGSN treats the wireless zone formed by the subordinate wireless base stations 3 as a single location registration area (RA #1, etc). The SGSN has the function of calling the mobile station 4, and depending on the response from the mobile station 4, it establishes a communication path to mobile station 4 via one of the wireless base stations 3 making up the wireless zone in the location registration area in which the response was received.

HLR 13 is a data base for managing the current location of the mobile station 4, which makes it possible to specify the area for calling the mobile station 4 for voice and packet communication.

Namely, the mobile station 4 moves between zones formed by the wireless base stations 3, and detects the location registration area it is in based on area information announced by the wireless base stations 3. When there is a change in the location registration area stored by the mobile station in question, location registration is performed via a wireless base station 3 to update the current location managed by the HLR. The current location of the mobile station 4 is thereby updated as the mobile station 4 moves, making it possible for the HLR 13 to manage and store the most recent current location of the mobile station 4.

While FIG. 2 shows distinct LAs and RAs, it is also possible to unify the two areas and manage the location of the mobile station 4 based on the LA only, with the MSC 11 and SGSN 12 calling the mobile station 4 for voice communication and packet communication using LA as a unit.

Literature relating to location registration includes the following publicly known literature: Japanese Unexamined Patent Application Publication S61-18229

SUMMARY OF THE INVENTION

Since the location of mobile stations in a mobile communication system needs to be managed, the mobile station stores the previously registered location registration area, and if the stored location registration area is different from the location registration area detected based upon announcement information from a wireless base station, updating of the location registration area is determined to be necessary, and location registration area updating (location registration) with HLR is performed via the wireless base station.

However, since location registration requires exchanging wireless signals with a wireless base station, wireless resources are consumed during location registration.

In particular, when a plurality of mobile stations moves simultaneously by means of a mass transit means (train, bus, airplane, bus, etc), they will perform location registration simultaneously with the same wireless base station. This leads to problems such as a large amount of wireless resources being consumed at once due to the concentration of location registrations, and a temporary increase in the processing load of the nodes performing processing involved in location registration (MSC, SGSN, HLR, etc).

The present invention has the objective of relieving the concentrated occurrence of location registrations.

A further objective of the present invention is to at the same time preferably make allowances for calls to the mobile stations.

Providing beneficial effects, not limited to the above objectives, derived from the various components of the best mode for practicing the invention as described below and which cannot be obtained from the prior art can also be positioned as an objective of the present invention.

(1) The present invention employs a mobile station used in a mobile communication system which accepts location registrations from mobile stations in order to perform mobile station location management, said mobile station being characterized in that it comprises: a detection means which detects that it is in an overlap region of hierarchical location registration areas; and a delay means which delays location registration when said detection has been made.

(2) The present invention furthermore employs a mobile station as set forth in (1), characterized in that said detection means performs detection based on information announced by a wireless base station forming part of said wireless communication system.

(3) The present invention furthermore employs a mobile station as set forth in (1), characterized in that said delay means delays location registration for a delay time determined by computation based on the given station's own identification information.

(4) The present invention furthermore employs a mobile station as set forth in (1), characterized in that the overlap region of hierarchical location registration areas detected by said detection means is a region of overlap with a second tier location registration area having a wider area than the first tier location registration area for which location registration has already been effected, and said delay of location registration concerns location registration in said second tier location registration area.

(5) The present invention employs a wireless base station used in a wireless communication system which accepts location registrations from mobile stations in order to perform mobile station location management, said wireless base station being characterized in that it comprises an annunciation means which announces to mobile stations that the wireless zone constituted by the wireless base station is contained in an overlap region of a first tier location registration area and a second tier location registration area wider than said first tier location registration area.

(6) The present invention furthermore employs a wireless base station as set forth in (5), characterized in that said wireless zone corresponds to the wireless zone of the boundary area of said second tier location registration area.

(7) The present invention furthermore employs a wireless base station as set forth in (5), characterized in that said annunciation means transmits a parameter which allows lengthening of selectable delay times by which location registration in said second tier location registration area is delayed by the mobile station.

(8) The present invention employs a wireless base station used in a wireless communication system which accepts location registrations from mobile stations in order to perform mobile station location management, said wireless base station being characterized in that it comprises an annunciation means which announces to mobile stations that the wireless zone constituted by the wireless base station is contained in an overlap area of a first tier location registration area and a second tier location registration area wider than said first tier location registration area, and that the boundary of said overlap area is being approached.

The present invention makes it possible to relieve concentrated occurrence of location registrations.

Furthermore, it makes allowances at the same time for calls to the mobile stations.

DETAILED DESCRIPTION OF THE PREFERRED EMBODIMENTS

Figure 1:
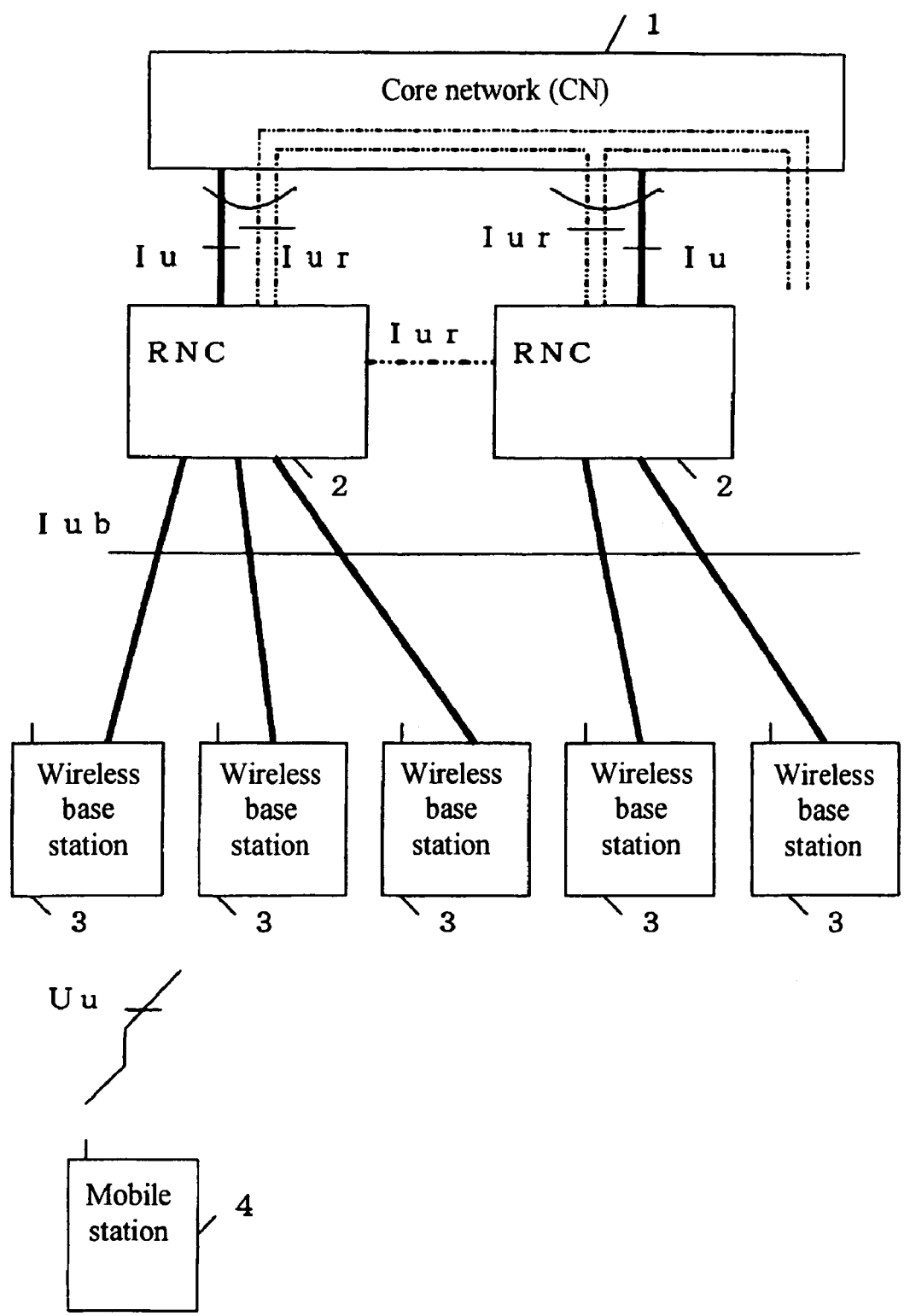
FIG. 1 is a diagram illustrating a mobile communication system.
Figure 2:
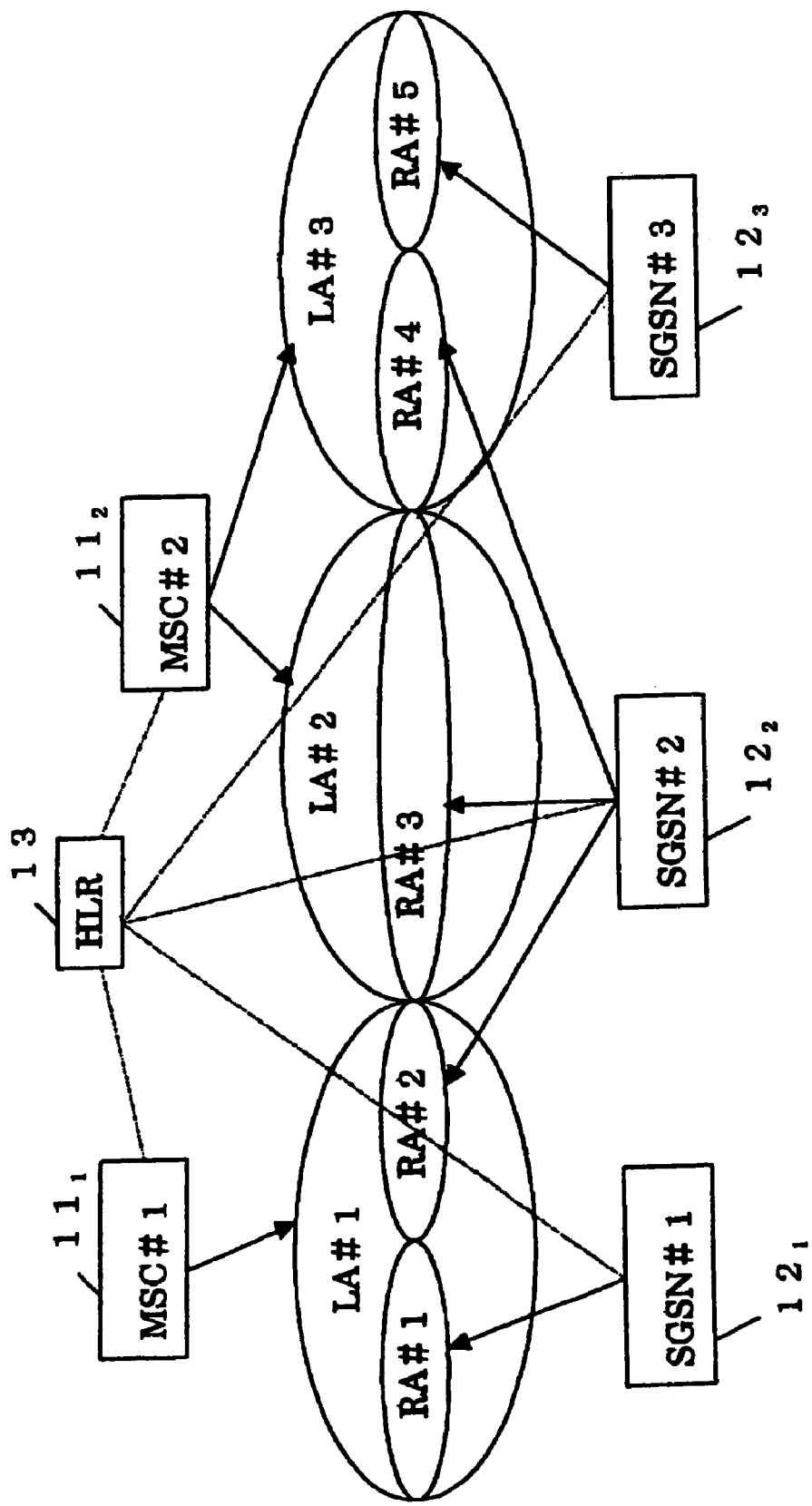
FIG. 2 is a diagram serving to explain location registration processing.

Below, embodiments of the present invention are described by referring to the drawings.

(a) Description of the First Embodiment

In the first embodiment, it is assumed that the configuration of the location registration areas is hierarchical and that the opportunities for performing location registration are dispersed. It is also possible to employ a technique whereby location registration opportunities are dispersed without making the location registration areas hierarchical.

It is assumed that the WCDMA (UTRA FDD) mobile communication system configuration illustrated in FIG. 1 will be used as the basic communication system configuration. Rather than differentiating devices that perform routing of voice communication and packet communication, such as MSC and SGSN, it also possible to have unified routers or the like which perform the routing of both.

In the present embodiment, wireless base station, mobile station and HLR are respectively assigned the reference numbers 30, 40 and 130.

Location Registration Area

First, the configuration of the location registration areas in the present embodiment will be described.

Figure 3:
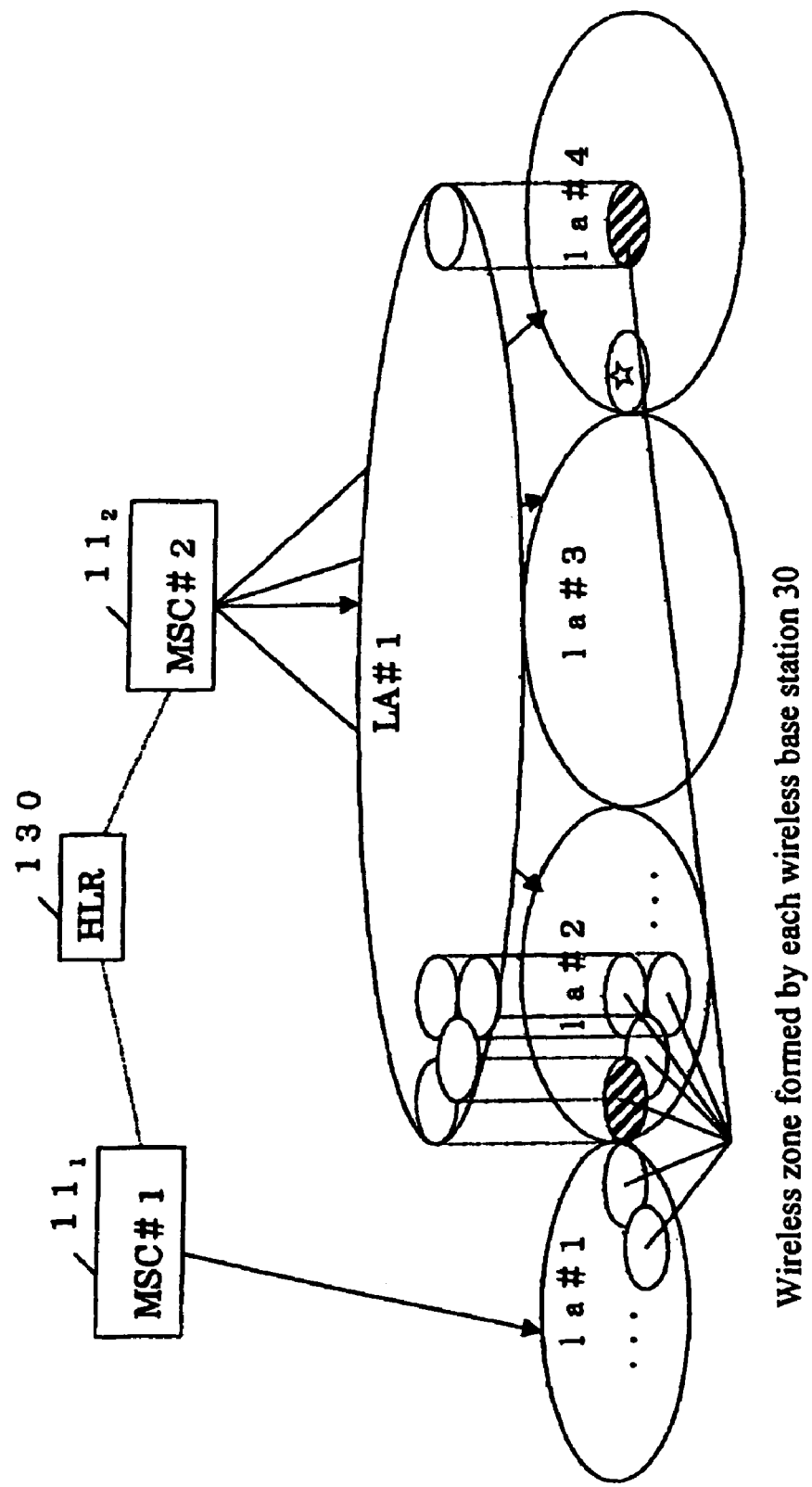
FIG. 3 is a diagram illustrating the configuration of location registration areas according to the present invention.

FIG. 3 is a diagram that illustrates the configuration of the location registration areas.

In FIG. 3, the distinctive point is that hierarchical location registration areas are formed by providing not only first tier location registration areas LA but also a second tier location registration area LA (the location registration areas are depicted three-dimensionally for ease of understanding). A further characteristic is that the second tier location registration area LA #1 is made wider than the first tier location registration area LA #2. The second tier location registration area LA #1 would be effectively formed for example along a bus route on which a large number of mobile stations can move.

Furthermore, in the drawing, the left boundary of the second tier location registration area (LA #1) is aligned with the boundary of a first tier location registration area (LA #2) while the right boundary of the second tier location registration area (LA #1) is not aligned with the boundary of a first tier location registration area (LA #4). However, it is also possible to set the boundary of a first tier location registration area so as to coincide with the boundary of a plurality of combined first tier location registration areas, or conversely, to set the boundary of a first tier location registration area so as not to coincide with the boundary of a plurality of combined first tier location registration areas.

Each location registration area is made up of a plurality of wireless zones formed by wireless base stations 30, and the wireless base stations contained in each location registration area inform the mobile station 40 of the location registration area which the mobile station 40 is currently in by announcing the area information of that location registration area (information of LA #1, 2, 3 or 4, LA #1, etc).

However, a wireless base station contained in both a first tier location registration area (e.g. LA #2) and a second tier location registration area (e.g. LA #1) (a wireless base station arranged in an overlapping location registration area (for instance, the wireless base station forming the striped wireless zone inside LA #2)) announces LA #2a and LA #1 as the location registration information (indicating that this is an overlapping location registration area).

Preferably, wireless base stations lying at the boundary of a second tier location registration area (e.g. the boundary wireless base stations forming the striped wireless zones in LA #2 and LA #4) provide an overlapping location registration area start notification as the area information in order to inform the mobile station 40 that this is an overlapping location registration area (a boundary of a second tier location registration area).

The hierarchical location registration area is as described above, and the corresponding core network 1 contains MSC 11 as the voice communication routing device and HLR 130 as the location management device. For packet communication, the MSC can be replaced with an SGSN or with a routing device that handles both voice communication and packet communication.

In the drawing, MSC #1 is connected to the wireless base stations 30 in location registration area #1, and MSC #2 is connected to the wireless base stations 30 contained respectively in location registration areas LA #2 through 4 (location registration areas overlapping with location registration area LA #1) and location registration area LA #4 (location registration area not overlapping with location registration area LA #1).

HLR 130 manages and stores the location information of mobile stations 40 so that it can be looked up by the MSCs (routing devices).

Next, the configuration and operation of the wireless base stations 30 contained in the hierarchical location registration areas will be described.

Wireless Base Station

Figure 4:
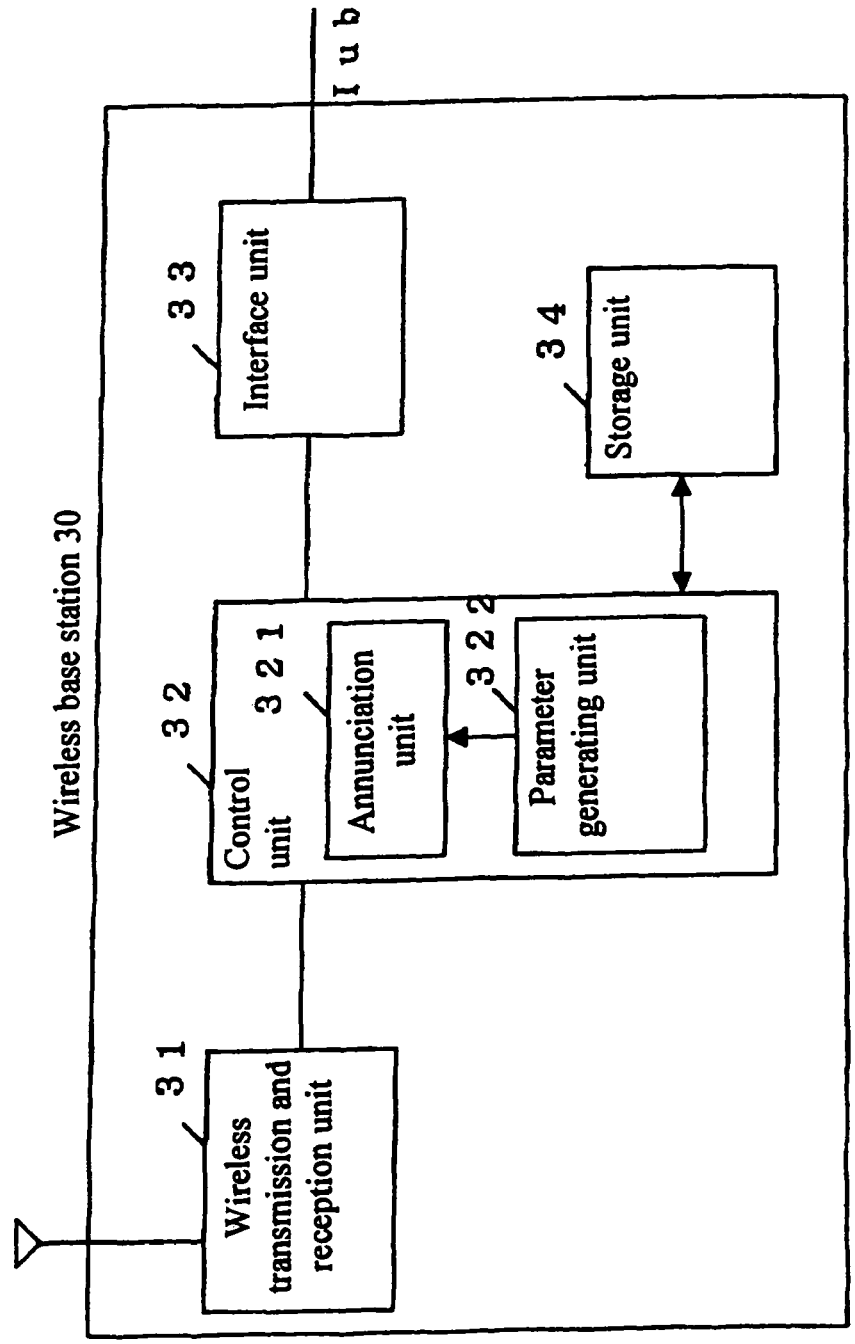
FIG. 4 is a diagram illustrating a wireless base station according to the present invention.

FIG. 4 is a drawing representing the configuration of a wireless base station.

In the drawing, 31 represents a wireless transmission and reception unit for conducting wireless communication with mobile stations 40; 32 represents a control unit which controls the various other units and comprises a parameter generation unit and annunciation means; 34 represents a storage unit which stores information to be transmitted to mobile stations 40, information received from mobile stations 40, and the like; and 33 represents an interface unit which interfaces with higher level devices (wireless base station controller 2).

The basic operation of the wireless base station 30 involves storing information addressed to mobile stations 40 received via Iub from a higher level device in the storage unit 34 and transmitting it via the wireless transmission and reception unit 31 to the mobile stations 40, as well as demodulating and decoding signals received from mobile stations 40 and forwarding them via Iub to the higher level device.

Furthermore, in order to enable location registration processing by mobile stations 40 as described above, the wireless base station announces the location registration area information to the mobile stations 40 via the annunciation means 321.

The information to be announced can be acquired via Iub from a higher level device, or else data stored in the storage unit 34 can be read out and used.

In FIG. 3, the wireless base stations in LA #1, which does not have a hierarchical location registration area configuration, announce LA #1 as the location registration area information, while wireless base stations within overlapping location registration areas announce LA #2 and LA #1 (indicating that this is an overlapping location registration area) as the location registration area information.

More preferably, the boundary wireless base stations forming the wireless zone at the boundary of the second tier location registration area, such as the striped wireless zones of LA #2 and 4, are made to issue an overlapping location registration area start notification (LA #1 start) differing from the notification that this is an overlapping location registration area.

Upon receiving a notification that this is an overlapping location registration area or an overlapping location registration area start notification, each mobile station 40 performs processing to delay location registration (in the second tier location registration area) by a respectively different period of time.

Furthermore, in the drawing, 322 represents a parameter generating unit, which generates dispersal parameters to be announced to mobile stations 30 according to parameter information provided via Iub from a higher level device or parameter information stored in the storage unit 34.

The size of a single overlapping location registration area varies depending on the size of the second tier location registration area.

However, if the time by which location registration is delayed is made the same regardless of the size of the overlapping location registration area, it is possible that situations will arise where, for instance, hardly any location registrations are made in the second tier location registration area.

Thus, preferably, the time by which location registration is to be delayed by the mobile station 40 is changed according to the size of the overlapping location registration area.

In other words, by setting the dispersal parameter transmitted in cases where the overlapping location registration area is large such that longer times can be selected for the selectable time period by which location registration is delayed by the mobile station 40 as compared to cases where the overlapping location registration area is small, the delay time is spread over a wider range.

For example, if LA #1 (the overlapping location registration area) is small, in the boundary wireless base stations of the striped zone in LA #2 (LA #4), delay times t1, t2 and t3 (t1<t2<t3) would be generated as the dispersal parameter information by the parameter generating unit 322 and transmitted to the mobile stations 40, and if LA #1 (the overlapping location registration area) is large, in the boundary wireless base stations of the striped zone in LA #2 (LA #4), delay times t1, t2, t3, t4 and t5 (t1<t2<t3<t4<t5) would be generated as dispersal parameter information by the parameter generating unit 322 and transmitted to the mobile stations 40 by the annunciation means 321 via the wireless transmission and reception unit 31.

Rather that announcing the actual delay time, it is more preferable to transmit dispersal parameter information for the mobile stations 40 to use to determine the delay time.

For example, a mobile station 40 can use the value obtained by dividing the identification information (a mobile device-specific number) of that mobile station 40 by the dispersal parameter information (e.g. 4096, 2048, 1024, 512, etc), and multiplying the remainder by a specific time coefficient (the time corresponding to one wireless frame (10 ms)).

While the dispersal parameter information here was transmitted only by the boundary wireless base stations belonging to an overlapping location registration area, it is also possible to have it transmitted by other wireless base stations belonging to an overlapping location registration area.

Next, the configuration and operation of the mobile station of the present embodiment will be described.

Mobile Station

Figure 5:
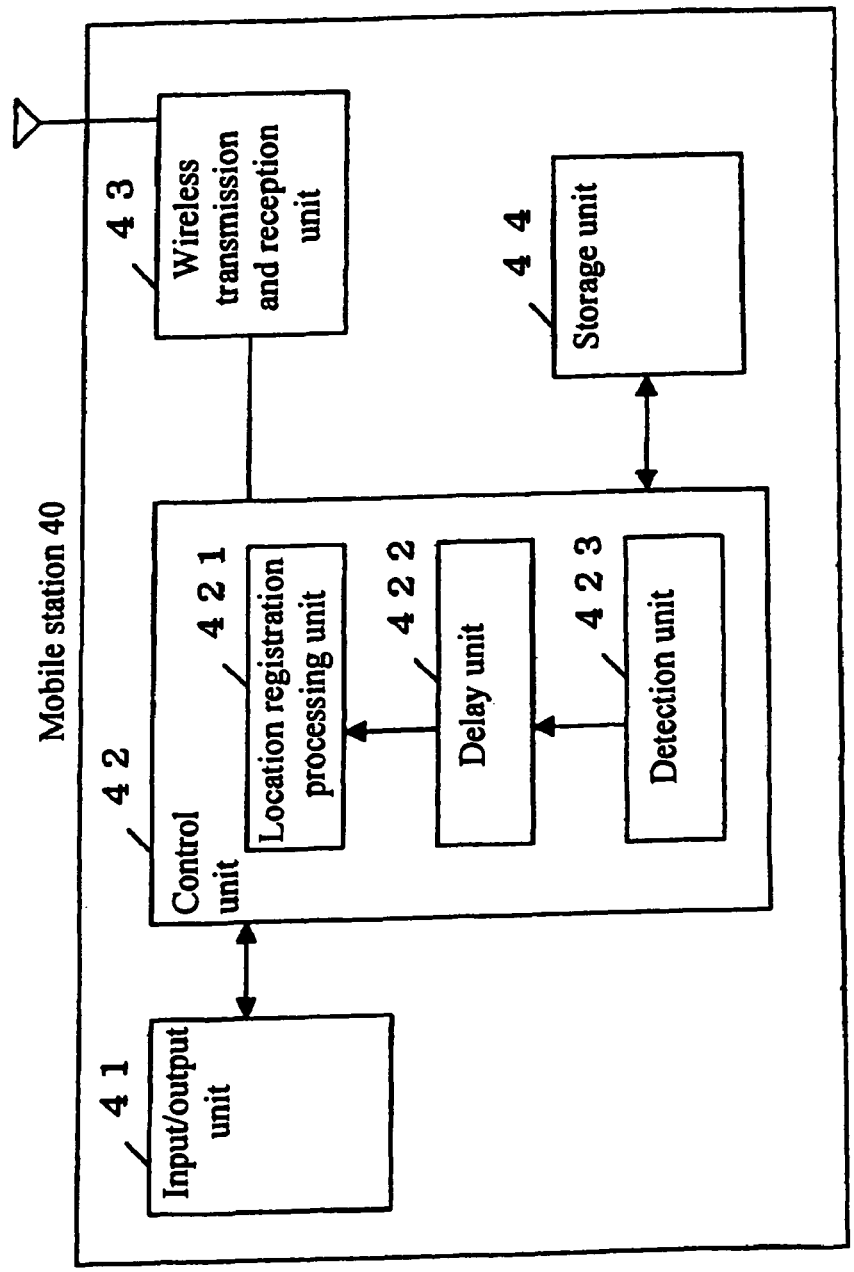
FIG. 5 is a diagram illustrating a mobile station according to the present invention.

FIG. 5 is a diagram illustrating the configuration of a mobile station 40 according to the present invention.

In the drawing, 41 represents an input/output unit for inputting and outputting voice, images, data and the like; 423 represents a detection means which detects that the mobile station is in an overlapping location registration area; 422 represents a delay means which performs control to delay location registration; and 421 represents a location registration processing unit which performs delayed location registration according to the control of the delay means when detection has been made by the detection means.

43 represents a wireless transmission and reception unit for receiving wireless signals from the wireless base stations 30 and transmitting information passed on from the control unit 42 to the wireless base stations 30.

44 represents a storage unit that stores various types of data as well as the most recent location registration area information for the previously performed location registration.

Here, the location registration operation for the case where the mobile station 40 moves from left to right in FIG. 3 (from LA #1 successively to LA #2, #3 and #4) will be described.

The mobile station 40, which is located in LA #1 and has completed location registration indicating that it is in LA #1 with the HLR 130, stores LA #1 as the location registration area in its storage unit 44.

When the mobile station 40 moves toward LA #2 and enters the area of the striped wireless base station 30 of LA #2, the detection means 423 detects that an overlapping location registration area is being approached based on the overlapping location registration area information (or overlapping location registration area start notification) provided by the wireless base station 30.

Based on this detection, the mobile station 40 knows that it has entered a second tier location registration area (LA #1), which has a wider location registration area range, but if many mobile stations 40 were to perform location registration in LA #1 at once, congestion of location registration would occur.

Thus, mobile station 40 performs control to delay location registration in LA #1.

However, if a change in location registration area is detected before performing delayed location registration in the second tier location registration area, updating of location registration area (location registration) for the first tier location registration area can be performed without delay. Although it is possible that location registrations for the first tier location registration area will be performed all at once (since the boundaries of the first and second tier location registration areas are aligned on the left), by means of delayed location registration, each mobile station will perform location registration in LA #1 with a different timing, thus making it possible to reduce simultaneous location registration occurring upon moving from LA #2 to LA #3.

Furthermore, since delayed location registration in an overlapping location registration area is permitted, situations where the HLR 130 cannot manage the most recent location of the mobile station 40 do not arise (the mobile station is registered in at least one of the first or second tier location registration areas), thus making it possible to prevent situations where the location of mobile station 40 at the time of an incoming communication is unknown and the mobile station cannot be called.

When the mobile station 40 moves from LA #4 to the left, as a result of delayed location registration, each mobile station will perform location registration in LA #1 with a different timing (as the boundary of the first and second tier location registration areas are not aligned on the right), thus making it possible to reduce simultaneous location registrations occurring upon moving from LA #4 to LA #3.

As the technique of performing delayed location registration, for example, one of either t1 (=0) or t2 (>0) can be selected and the time at which location registration is performed can be delayed by the selected time period (e.g. t2). Of course, in order to avoid having other mobile stations 40 all select the same time period, it is preferable to employ a dispersal method such as selecting t1 or t2 depending on whether the identification number of the given mobile station is even or odd.

The SFN (system frame number) can be used as another dispersal method, by applying the following formula.

SFN at which location registration is to be initiated=(mobile device identification number mod current SFN).

While the delay time selection candidates and computation algorithm can all be stored in the storage unit 44 of the mobile station 40 and the delay time determined based on that, it is more preferable to have the parameters designated by the mobile communication network.

For example, upon receiving the dispersal parameter information described above, the mobile station 40 can perform the computation according to the following formula to determine the time period for the delay.

Delay time=(mobile device identification number mod received dispersal parameter information)×time coefficient Here, for example the time period of one wireless frame (10 ms) can be used as the time coefficient.

To give an example calculation, $$\text{Delay time} = (10000 \bmod 4096) \times 10 = 18080 \text{ ms}$$

After delayed location registration has been performed, if the mobile station 40 moves further and arrives in the area of LA #3, the mobile station 40 will detect that it is in an overlapping location registration area with LA #3 as the first tier location registration area, but since it has already registered its location in the second tier location registration area which is wider than the first tier location registration area and there is no change in the second tier location registration area, no location registration is performed here. Thus, simultaneous location registration is prevented at this stage.

Of course, if there is a change in the second tier location registration area (for example, if there are two or more adjacent second tier location registration areas), location registration which is not the above delayed location registration may be performed.

Moving further to the right from the striped wireless zone in LA #4, the mobile station 40 detects based on information announced by a wireless base station 30 that it has moved into a location registration area which is not an overlapping location registration area, and location registration in LA #4 is executed without the above-indicated delay processing.

However, since location registration in LA #4 could occur all at once, preferably, the wireless base station 30 in a location registration area overlapping with a first tier location registration area (La #4) outside the boundary area of the second tier location registration area (LA #1) (particularly, in the wireless zone at the boundary of LA #4 marked with a star) will provide an overlapping location registration area end warning.

Upon receiving an overlapping location registration area end warning from the wireless base station 30, the mobile station 40 performs the previously described delayed location registration processing to register in LA #4.

It is preferable to transmit parameter information along with the overlapping location registration area end warning. In cases where this cannot be received or the like, the parameter information and delay time stored in storage unit 44 upon location registration in LA #1 can be used.

Furthermore, in case delayed location registration fails, it is preferable to check again if there is a need for location registration (receive the location registration area information again from the wireless base station 30 and check if it is the same as the location registration area stored in storage unit 44), and if there is such a need, (if the stored location registration area and the received location registration area are different), to re-execute the delayed location registration anew. Of course, if delayed location registration failed, the next time location registration may be performed without delay.

Furthermore, one can create mobile stations that perform location registration in first tier location registration areas without performing delayed location registration in second tier location registration areas.

For example, a slowly moving mobile station can be made to perform location registration in first tier location registration areas.

Next, location management of mobile stations 40 will be described.

"Location Management Device (HLR)"

Figure 6:
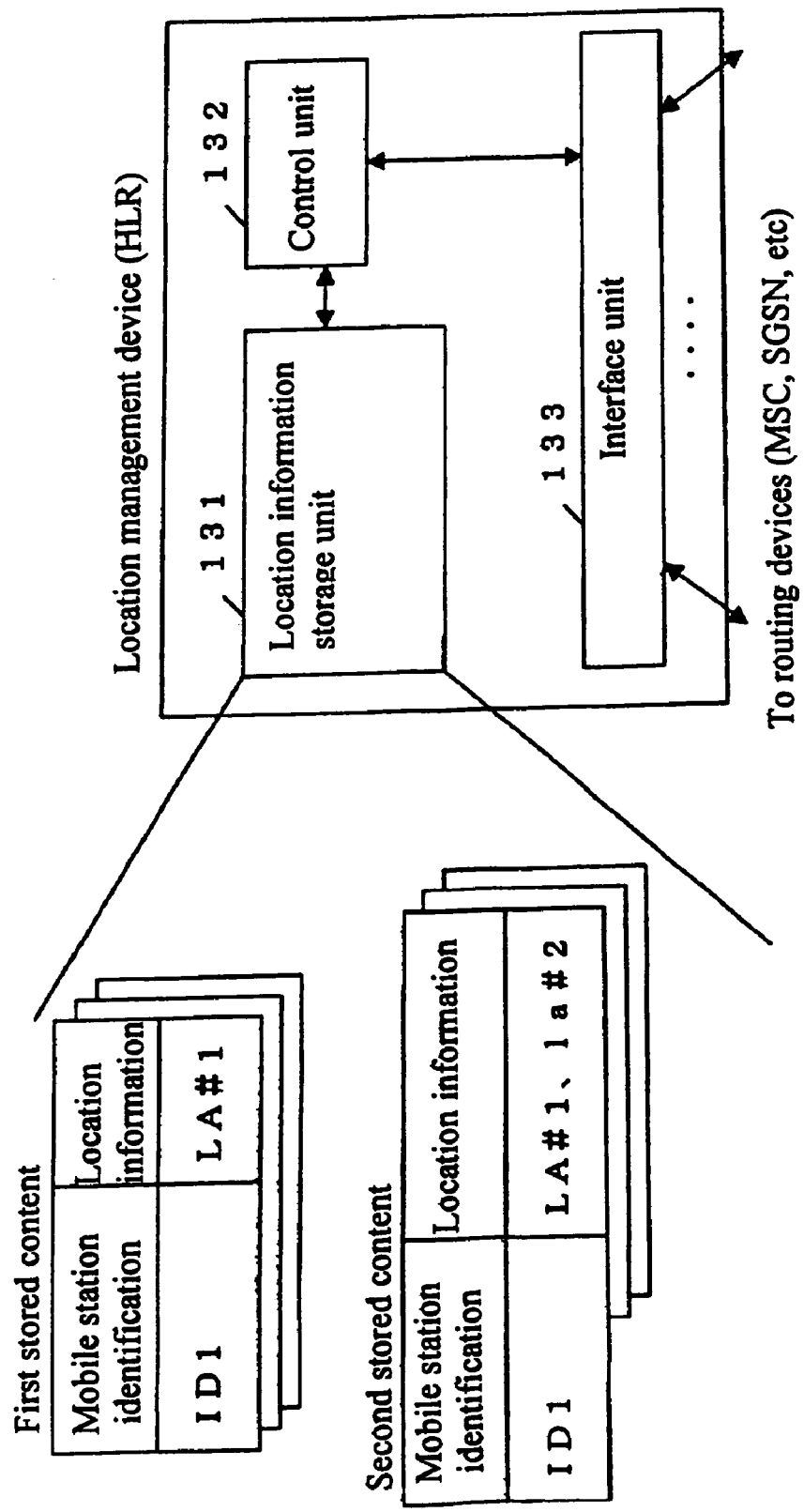
FIG. 6 is a diagram illustrating a location management device according to the present invention.

FIG. 6 is a diagram illustrating the configuration of a location management device (HLR/VLR) according to the present embodiment.

133 represents an interface unit that interfaces with the various routing devices (MSC 11, SGSN 12, etc). 132 represents a control unit which updates the current area of mobile stations 40 stored in the location information storage unit 131 based on location registration information (e.g. location registration area information) received from the mobile stations 40 via the interface unit 133, and responds to mobile station 40 current location inquiries from the various routing devices (MSC 11, SGSN 12, etc) with the corresponding stored information read from the storage unit 131.

The routing devices call the mobile station 40 in the location registration area corresponding to the location information indicated in the response from the location management device. Here, if only a first tier was registered as the location registration area, the call is made in the first tier location registration area, while if both tiers or the second tier has been registered, it is preferable to perform the call in the second tier location registration area.

The table shown on the left side of the location information storage unit 131 presents examples of what is stored in the location information storage unit 131.

The first stored content illustrates stored content for a case where the first tier location is not stored when performing second tier location registration, while the second stored content illustrates stored content for a case where the first tier location is stored even when performing second tier location registration.

In any event, when second tier location registration has been carried out, calling would be performed in the second tier location registration area, but if there is no response, in the case of the second stored content, it would be possible to read the first tier location information directly from the stored content and repeat the call, while in the case of the first stored content, all first tier location registration areas overlapping with LA #1 (which are needed to cover LA #1) would be determined and the call would performed from wireless base stations 30 in all the determined location registration areas.

(b) Description of the Second Embodiment

In the first embodiment, the wireless zones which are the constituent units of the first and second tier location registration areas were managed by a common wireless base station 40, while in this example, the second tier location registration area is implemented by a separate device.

For example, an annunciation device for announcing, to mobile stations 40, overlapping location registration area information indicating that they are within LA #1 (since LA's are basically arranged for complete coverage, the announcement of location registration area LA #1 can be interpreted as overlapping location registration area information (the same is true for the first embodiment)) can be installed in a vehicle that travels within LA #1, and upon receiving the overlapping location registration area information announced by this annunciation device, a mobile station 40 would perform the delayed location registration processing presented above.

Parameter information can be announced by this annunciation device.

The annunciation device has the functions corresponding to a wireless base station. In cases where it is capable of calling and establishing wireless communication with mobile stations 40, calls can be executed by wireless transmission of a call signal to the annunciation device, while if it does not have such a function, calling would be performed via a wireless base station serving LA #1 (a first tier wireless base station with the same range as LA #1 or a wireless base station forming the smallest first tier location registration area group which covers LA #1).

The annunciation device can also be arranged statically in the mobile communication system rather than installing it in a vehicle.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A wireless communication system having wireless base stations which belong to a hierarchical location registration area wherein the wireless communication system accepts location registrations from mobile stations in order to perform mobile station location management, the wireless communication system comprising:
a first wireless base station group which belongs to the hierarchical location registration area and an another hierarchical location registration area which overlaps the hierarchical location registration area and having a transmitting unit operable to transmit, to mobile stations, area information which indicates that the first wireless base station group belongs to an overlap region of both the hierarchical location registration area and the another hierarchical location registration area, and transmit a parameter which allows lengthening of selectable delay times by which the mobile station delays location registration in the another hierarchical location registration area which overlaps the hierarchical location registration area, wherein the time by which location registration is delayed by the mobile station is changed according to a size of the overlap of the hierarchical location registration areas; and
a second wireless base station group which belongs to the hierarchical location registration area and does not belong to the another hierarchical location registration area, and having a transmitting unit operable to transmit, to mobile stations, another area information which indicates that the second wireless base station group belongs to the hierarchical location registration area and does not belong to the another hierarchical location registration area,
wherein the first wireless base station group and the second wireless base station group are included in the wireless base stations.

2. A wireless base station used in a wireless communication system which accepts location registrations from mobile stations in order to perform mobile station location management and belongs to a first location registration area and a second location registration area, a part of the first location registration area overlapping with a part of the second location registration area and forming a hierarchical structure, the wireless base station comprising:
a transmitting unit which transmits, to mobile station, area information which indicates the wireless base station belongs to the first location registration area and the second location registration area, and end warning information which alerts that the mobile stations are approaching to a boundary wireless zone of the first location registration area so as to delay location registration in the second location registration area wherein the wireless base station forms a wireless zone which does not belong to the boundary wireless zone of the first location registration area, and the mobile station performs processing to delay location registration in the second location registration area which overlaps the first location area upon receiving the end warning information from the wireless base station, wherein the time by which location registration is delayed by the mobile station is changed according to a size of the overlap of the first and second location registration areas.

3. The wireless communication system according to claim 1, wherein the mobile station performs processing to delay location registration in the another hierarchical location registration area on the basis of the parameter upon receiving the area information from the first wireless base station group.

4. A wireless communication system having wireless base stations which belong to a hierarchical location registration area wherein the wireless communication system accepts location registrations from mobile station in order to perform mobile station location management, the wireless communication system comprising:
a first wireless base station group which belongs to the hierarchical location registration area and an another hierarchical location registration area which overlaps the hierarchical location registration area and having a transmitting unit operable to transmit, to mobile stations, area information which indicates that the first wireless base station group belongs to an overlap region of both the hierarchical location registration area and the another hierarchical location registration area; and
a second wireless base station group which belongs to the hierarchical location registration area and does not belong to the another hierarchical location registration area, and having a transmitting unit operable to transmit, to mobile stations, another area information which indicates that the second wireless base station group belongs to the hierarchical location registration area and does not belong to the another hierarchical location registration area,
wherein the first wireless base station group and the second wireless base station group are included in the wireless base stations, the mobile station performs processing to delay location registration in the another hierarchical location registration area on the basis of a parameter upon receiving the area information from the first wireless base station group, the parameter allowing lengthening of selectable delay times by which the mobile station delays location registration in the another hierarchical location registration area which overlaps the hierarchical location registration area, wherein the time by which location registration is delayed by the mobile station is changed according to a size of the overlap of the hierarchical location registration areas.

5. A mobile station used in a mobile communication system which accepts location registrations from mobile stations in order to perform mobile station location management, the mobile station comprising:
a detection unit which detects that the mobile station is in an overlap region of a first location registration area and second location registration area; and
a delay unit which delays location registration to update location registration area from the first location registration area to the second location registration area on the basis of a parameter stored in the mobile station upon detecting that the mobile station is in the overlap region, the parameter allowing lengthening of selectable delay times by which the mobile station delays location registration in the second location registration area which overlaps the first location area, wherein the time by which location registration is delayed by the mobile station is changed according to a size of the overlap of the first and second location registration areas.

* * * * *